(12) United States Patent
Zhang et al.

(10) Patent No.: US 11,275,002 B2
(45) Date of Patent: Mar. 15, 2022

(54) METHOD FOR DETECTING MECHANORESPONSE OF MECHANICAL COMPONENT BY ORGANIC MECHANORESPONSIVE LUMINOGEN

(71) Applicants: Tianjin University, Tianjin (CN); The Hong Kong University of Science and Technology, Hong Kong (CN)

(72) Inventors: Zhe Zhang, Tianjin (CN); Benzhong Tang, Hong Kong (CN); Xu Chen, Tianjin (CN); Zijie Qiu, Hong Kong (CN); Weijun Zhao, Hong Kong (CN)

(73) Assignees: Tianjin University, Tianjin (CN); The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 16/492,942

(22) PCT Filed: Apr. 26, 2018

(86) PCT No.: PCT/CN2018/084671
§ 371 (c)(1),
(2) Date: Sep. 11, 2019

(87) PCT Pub. No.: WO2019/184040
PCT Pub. Date: Oct. 3, 2019

(65) Prior Publication Data
US 2021/0333181 A1 Oct. 28, 2021

(30) Foreign Application Priority Data

Mar. 27, 2018 (CN) .......................... 201810258759.8

(51) Int. Cl.
*G01N 3/08* (2006.01)
*G01N 3/06* (2006.01)

(52) U.S. Cl.
CPC .............. *G01N 3/068* (2013.01); *G01N 3/08* (2013.01); *G01N 2203/0017* (2013.01);
(Continued)

(58) Field of Classification Search
CPC .. G01N 3/08; G01N 33/15; G01N 2033/0091; G01N 2203/0019; G01N 2203/0284
See application file for complete search history.

(56) References Cited

U.S. PATENT DOCUMENTS 8,525,979 B2 * 9/2013 Lam ..................... G01B 11/168
356/35
9,441,955 B2 * 9/2016 Keng ........................ G01L 1/24
(Continued)

*Primary Examiner* — Max H Noori
(74) *Attorney, Agent, or Firm* — George G. Wang; Bei & Ocean

(57) ABSTRACT

The present invention discloses a method for detecting the mechanical response of a mechanical component by an organic mechanoresponsive fluorescent material, comprising the following steps of: selecting an organic mechanoresponsive fluorescent material; preparing an organic mechanoresponsive fluorescent material solution; forming a film on a metal surface; calibrating fluorescence intensity and obtaining the fluorescence intensity and distribution in a crack tip area; observing the fluorescence signal generated at cracks to monitor the occurrence of fatigue cracks, and predict a propagation pathway of fatigue cracks by using the fluorescence intensity distribution in the crack tip area.

5 Claims, 3 Drawing Sheets

(52) U.S. Cl.
CPC ........... *G01N 2203/0066* (2013.01); *G01N 2203/0073* (2013.01); *G01N 2203/0641* (2013.01)

(56) References Cited

U.S. PATENT DOCUMENTS

2017/0168037 A1* 6/2017 Moore ................. G01N 33/442
2018/0113035 A1* 4/2018 Kim ..................... G02F 1/0128

* cited by examiner

METHOD FOR DETECTING MECHANORESPONSE OF MECHANICAL COMPONENT BY ORGANIC MECHANORESPONSIVE LUMINOGEN

TECHNICAL FIELD OF THE INVENTION

The present invention relates to a method for dynamically and visually detecting a full-field stress/strain distribution and a fatigue crack propagation pathway of a mechanical component by using an organic fluorescent material with a mechanoresponsive property.

BACKGROUND OF THE INVENTION

The stress/strain distribution is the basis for the design and safety assessment of the mechanical component. With the development of industry, large complex components are widely used in various fields such as aerospace, high-speed rail and automobiles. Therefore, it is necessary to realize a wide range of stress/strain and crack defect detection, which is of great significance to ensure the safety of personnel and equipment. Particularly for complex structures, the fatigue failure resulted from local stress concentration will result in a large error between the theoretical calculation and the actual result, so it is unable to realize accurate prediction. In the conventional stress/strain distribution measurement methods, the local stress/strain distribution can be detected by converting force or deformation into electrical signals through resistance strain gauges, piezoelectric sensors, extensometers or the like. However, due to the limitations on the size of the sensors, these test methods can only be limited to local testing and very difficult to realize a wide range of stress/strain distribution detection of components. Other conventional technologies such as radiographic testing, ultrasonic testing, magnetic particle testing and eddy current testing have been used for nondestructive measurement of fatigue cracks, but these methods are very difficult to realize online and real-time visual detection. In recent years, a new technology (i.e., Digital Image Correlation (DIC)) has been applied to the visualization of the stress/strain distribution of large-area structural components. Its basic principle is to compare pictures in different deformation stages through software post-processing and then calculate the stress/strain distribution according to pixel changes at different positions. However, like the above-mentioned technologies, DIC is still not a direct visualization technology and cannot continuously visualize the stress/strain distribution in real time. Meanwhile, the DIC has certain limitations for the wide range of stress/strain detection of the large complex components. Therefore, the development of a technology capable of realizing non-contact and real-time visualization of a wide range of stress/strain distribution detection has a very high engineering application value.

Due to its advantages of easy detection, high sensitivity and real-time response, fluorescence has been widely applied in various fields such as illumination, analysis and process detection. Therefore, the fluorescence technology also has a very promising application prospect in the detection of stress/strain and fatigue crack propagation of mechanical components. The currently reported methods for detecting the stress/strain distribution and crack propagation of mechanical components by fluorescence mainly focus on inorganic materials (e.g., rare earth metals, quantum dots, etc.). A Chinese Invention Patent "METHOD FOR DETECTING AND MONITORING CRACKS OF MECHANICAL COMPONENTS BY USING FLUORESCENT QUANTUM DOTS" (Application No. CN 201210586280, Publication No. CN 103901003 A) has disclosed a method for detecting fatigue cracks of a mechanical component on the basis of fluorescence response of inorganic quantum dots.

Since the inorganic materials have poor compatibility with metals, it is usually necessary to additionally use organic epoxy resin as an adhesive. Moreover, due to the poor flowability of the epoxy resin, it is difficult to realize a wide range of application. Meanwhile, the inorganic materials have the characteristics of biological toxicity, non-renewability and the like, the extensive use of the inorganic materials is limited to a certain extent.

SUMMARY OF THE INVENTION

In view of the above problems, an objective of the present invention is to provide a method for detecting the mechanical response of a mechanical component by an organic mechanoresponsive fluorescent material.

The present invention employs the following technical solutions.

A method for detecting the mechanical response of a mechanical component by an organic mechanoresponsive fluorescent material is provided, including the following steps of:

(1) selecting an organic mechanoresponsive fluorescent material;

(2) preparing an organic mechanoresponsive fluorescent material solution;

(3) forming a film on a metal surface, that is uniformly coating the organic mechanoresponsive fluorescent material solution on a metal surface by a brush, and heating it by a heating tool to form a film;

(4) calibrating fluorescence intensity: performing uniaxial tensile test on metal samples coated with the organic mechanoresponsive fluorescent material, irradiating coatings on the samples by using an ultraviolet light source as an excitation light source, establishing a relation curve of the fluorescence intensity and the stress/strain by a fluorescence intensity measurement system to serve as fluorescence intensity sample data; analyzing a gray scale of pixels, representing the fluorescence intensity by using the gray scale of the pixels; or, measuring the fluorescence intensity by a fluorescence spectrometer;

(5) detecting a stress/strain distribution on an actual mechanical component, or monitoring fatigue crack propagation on the actual mechanical component.

The method for detecting the stress/strain distribution on the actual mechanical component is as follows: irradiating the organic mechanoresponsive fluorescent material film coated on the surface of the mechanical component to be detected by an UV light, and obtaining the stress/strain distribution on a part to be detected by using the fluorescence intensity obtained by the fluorescence intensity measurement system and comparing an actually measured fluorescence result with sample data of a fluorescence spectrum.

The method for monitoring fatigue crack propagation on the actual mechanical component is as follows: irradiating the organic mechanoresponsive fluorescent material film coated on the surface of the mechanical component to be detected by an UV light, observing fluorescence signal generated at cracks to monitor the occurrence of fatigue cracks, and detecting the fluorescence intensity and distribution in a crack tip area, wherein since high fluorescence intensity indicates high stress concentration, the fatigue crack is easy to propagate along the direction having high stress concentration, thus the crack propagation pathway could be predicted.

Preferably, the organic mechanoresponsive fluorescent material is tetranitro-tetraphenyl ethylene (TPE-4N).

Preferably, the concentration of the prepared TPE-4N solution is in the range of 1.00 to 0.01 g/mL, and the organic solvent is chloroform.

Preferably, the heating tool is a heat gun, a heating furnace or a heating jacket, and the heating temperature is in the range of 80° C. to 300° C.

The detection device is a CCD photographic system or a spectrometer.

The organic mechanoresponsive fluorescent material solution can be prepared in advance and stored away from light, is capable of coating on-site, and heated to form a film by a heat gun or a heating jacket.

The present invention has the following advantages.

(1) In the method for detecting the mechanical response of a mechanical component by an organic mechanoresponsive fluorescent material in the present invention, the detection of the stress/strain distribution and the fatigue crack propagation is included. By using the mechanoresponsive luminescence characteristic of the organic fluorescent material, the fluorescence response of the organic mechanoresponsive luminescent material film on the mechanical component is detected in real time and in a non-contact manner, so that a wide range of real-time stress/strain distribution on the surface of the mechanical component during a loading process can be accurately obtained, which provides a guidance for the design of large complex structures.

(2) The method of the present invention can early detect the fatigue cracks on the mechanical component and predict the propagation direction of the fatigue cracks. Accordingly, the dangerous parts of an important mechanical component can be monitored in real time so as to discover the cracks in time, and further detect and analyze the development trend and size of cracks.

(3) The method of the present invention utilizes tetranitro-tetraphenyl ethylene to be excited under UV light after being subjected to stress deformation, the fluorescence after excitation is visible to naked eyes, and the response is rapid, so that the stress/strain distribution and the shape, length and propagation pathway of fatigue cracks can be clearly distinguished. The present invention does not require collect images by other instruments, and the method has the advantages of simple, low cost, non-toxic and free of influence of the appearance of the detected component, and has a wide range of application.

(4) In the method for detecting the mechanical response of a mechanical component by an organic mechanoresponsive fluorescent material in the present invention, the fluorescence intensity on the surfaces of samples subjected to stress deformation is detected by a CCD photographic system or a spectrometer, so that the qualitative and quantitative analysis can be accurately realized. Moreover, the method is high in detection accuracy, effective for the stress deformation of the metal mechanical components, fatigue cracks or cracks at metal welds, and high in engineering application value.

(5) Due to the generated fluorescence will not disappear at the room temperature and after the mechanical force is unloaded, the method of the present invention is suitable for measuring the maximum stress/strain distribution of large complex metal components under complex loading conditions, and has an importance reference value for the design of mechanical structures.

DETAILED DESCRIPTION OF THE EMBODIMENT

Figure 1:
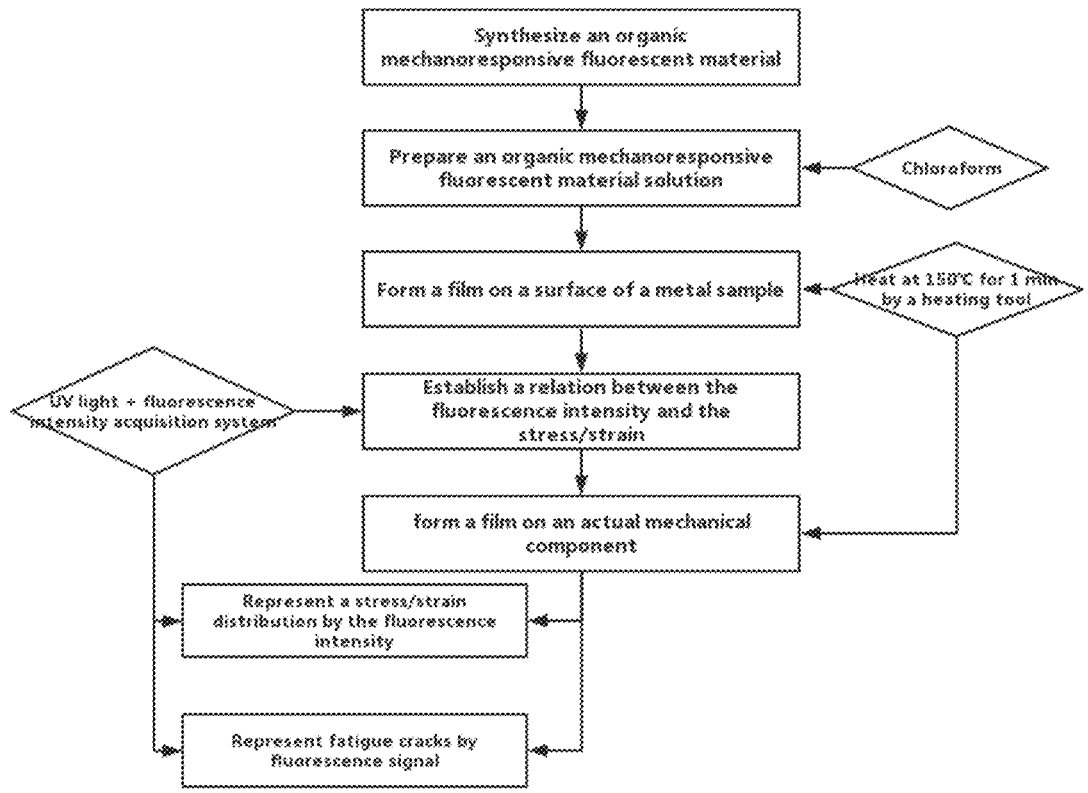
FIG. 1 shows a flow diagram of a detection method.

The flow diagram of the specific detection method is shown in FIG. 1, and the methods comprise:

(1) An organic mechanoresponsive luminescent material tetranitro-tetraphenyl ethylene (TPE-4N) is selected as a material, and synthesized by a chemical method. The synthesis method referred to the Chinese Invention Patent "PREPARATION OF MULTI-NITRO SUBSTITUTED TETRAPHENYLETHYLENE COMPOUNDS AND APPLICATION THEREOF" (Application No. CN 201310057959 and Publication No. CN104003886 A).

(2) A TPE-4N solution is prepared, then coated onto a surface of a metal component and heated to form a film. In accordance with the present invention, the following solutions are selectively prepared.

Embodiment 1: TPE-4N is dissolved in chloroform to obtain a TPE-4N solution having a concentration of 0.01 g/mL, and the solution is coated onto the metal surface by a brush and then heated at 80° C. for 20 min by a heat gun to form a film.

Embodiment 2: TPE-4N is dissolved in chloroform to obtain a TPE-4N solution having a concentration of 0.3 g/mL, and the solution is coated onto the metal surface by a brush and then heated at 150° C. for 1 min by a heat gun to form a film.

Embodiment 3: TPE-4N is dissolved in chloroform to obtain a TPE-4N solution having a concentration of 1 g/mL, and the solution is coated onto the metal surface by a brush and then heated at 300° C. for 30s by a heat gun to form a film. The heating tool could be a heat gun, a heating furnace, a heating jacket or the like, with the same effects.

The effects of the TPE-4N film formed by coating any one of the solutions prepared in Embodiments 1, 2 and 3 on the metal surface are the same, and the TPE-4N solution is stored away from light at a low temperature.

Figure 2:
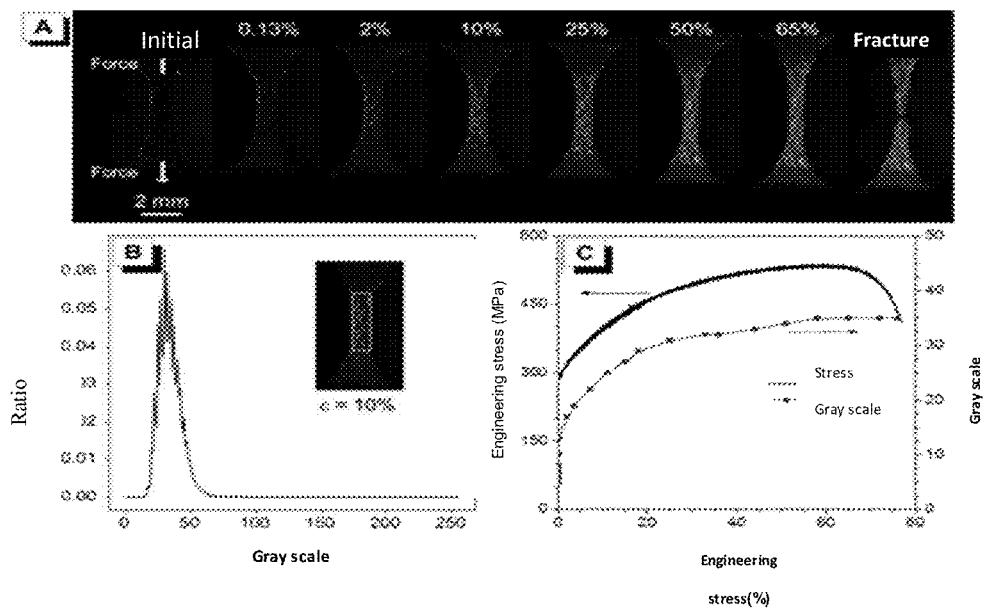
FIG. 2A shows a picture of the fluorescent surface of a 316L stainless steel.
FIG. 2B shows a diagram of a fluorescence gray scale.
FIG. 2C shows a tendency of the fluorescence intensity of 316L stainless steel with the change of stress/strain.

(4) Calibration of fluorescence intensity: as shown in FIG. 2, an uniaxial tensile test is performed on the 316L stainless steel metal samples coated with TEP-4N, coatings on the samples are irradiated by using an UV light as an excitation light source, fluorescence pictures (FIG. 2A) on the samples are acquired and recorded by a CCD photographic system in different stress/strain response stages, gray scales at sample gauge sections in the pictures are extracted, the average gray scale (FIG. 2B) of this area is analyzed, and the fluorescence intensity is represented by the gray scale. According to the test results, a curve of the fluorescence intensity and the size of stress/strain is established as the fluorescence intensity sample data (FIG. 2C).

Figure 3:
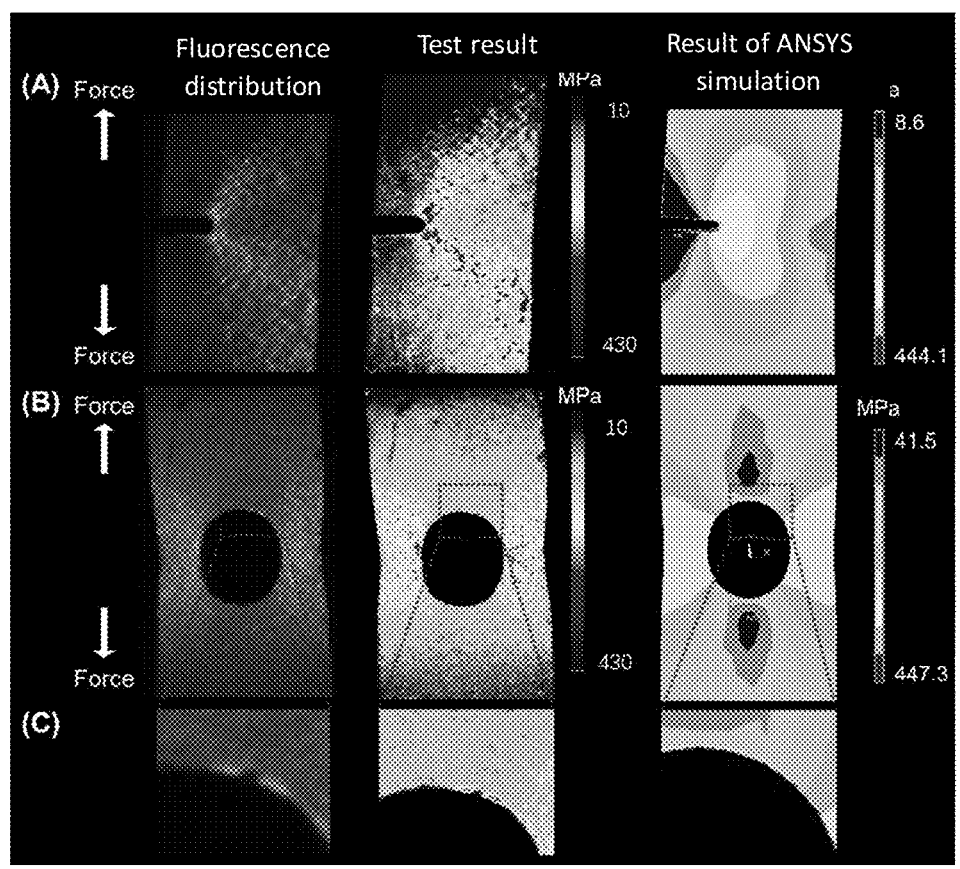
FIG. 3A shows the comparison of the stress distribution of a unilaterally-notched sample with the result of finite element simulation.
FIG. 3B shows the comparison of the stress distribution of a round hole sample with the result of finite element simulation.
FIG. 3C shows the comparison of the local stress distribution of a round hole sample with the result of finite element simulation.

Detection of the stress/strain distribution on an actual mechanical component: the stress/strain distribution is analyzed by taking a single edge notched tensile sample (FIG. 3A) and a round hole sample (FIGS. 3B and 3C) as examples. After the samples are subjected to tensile deformation, the pixel gray scale distribution on the surfaces of the samples is recorded by the CCD photographic system. The recorded gray scale is compared with the sample data in the curve of FIG. 2C to determine the size of stress corresponding to each pixel point. The results indicate that the maximum stress suffered by the deformed sample is about 430 MPa, and the minimum stress is about 10 MPa. The stress distribution is shown in FIG. 3. The result of fluorescence test provided by the present invention is basically consistent with the result of ANSYS finite element simulation, so that the effectiveness of this method is verified.

More importantly, the stress/strain detection method of the present invention can observe details that cannot be achieved by the theoretical simulation. For the ANSYS finite element simulation, calculation can only perform on an ideal model, and the defects of mechanical components during the actual machining process cannot be predicted. However, the unpredictable defects will cause local stress concentration in the actual samples, thus resulting in failure and damage. The present invention provides an experimental method, so the actual stress distribution of the samples can be reflected accurately in real time. As shown in FIG. 3C, when there is an unexpected small defect on an edge of the round hole in the sample during the machining process, this defect caused by machining cannot be predicted by the ANSYS finite element simulation, but the stress concentration near the defect can be clearly visualized by the method of the present invention. Therefore, the accuracy of measurement of the stress/strain distribution in the actual mechanical component in the present invention is reflected.

Monitoring of fatigue crack propagation on the actual mechanical component, the details are as follows: the TPE-4N film on the mechanical component to be monitored is irradiated by an UV light, and strong fluorescent signal at cracks are observed to monitor the occurrence of fatigue cracks. Meanwhile, the fluorescence intensity and distribution in a crack tip area can be detected. The fatigue cracks are easy to propagate along the direction having high stress concentration, thus a propagation pathway of fatigue cracks is predicted.

Figure 4:
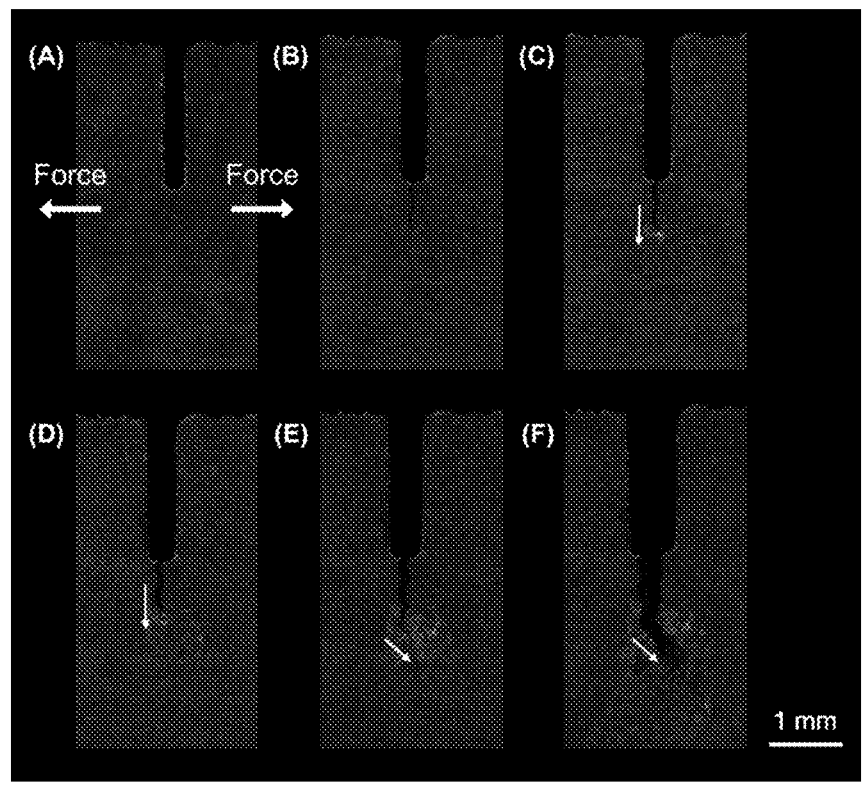
FIG. 4A shows the result of initial samples of 316L fatigue crack propagation test.
FIG. 4B shows the result of prefabricated cracks of 316L fatigue crack propagation test (F=300 N, 45000 circles))
FIG. 4C shows the result of 316L fatigue crack propagation test (F=700 N, 1000 circles)
FIG. 4D shows the result of 316L fatigue crack propagation test (F=700 N, 3000 circles)
FIG. 4E shows the result of 316L fatigue crack propagation test (F=700 N, 5000 circles)
FIG. 4F shows the result of 316L fatigue crack propagation test (F=700 N, 8000 circles)

Taking a single edge notched tensile sample of 316L stainless steel as an example, as shown in FIG. 4A, when no force is applied to the sample, there are no fatigue cracks and fluorescence signal. Firstly, cracks are prefabricated by a small repeative cyclic force (F=300 N) in 45000 cycles. At this time, since the loading force is small, the plastic area at the tip of the crack is small, and the fluorescence signal is not obvious (FIG. 4B). Then, a larger tensile force (F=700 N) is applied in 1000 cycles (FIG. 4C), there are fluorescence signals on edges of the prefabricated cracks. When the force is continuously applied to 3000 cycles, there are fluorescence signals at the tip and on two sides of the crack (FIG. D) along with the downward movement of the tip of the crack. As shown in FIG. 4E, when the force is applied to 5000 cycles, the fluorescence signals are more concentrated on the right side of the crack, indicating that the stress concentration point is on the right side of the crack, as indicated by the white arrow. Therefore, in the subsequent cycles, the crack begins to propagate to the right side, as shown in FIG. 4F.

Figure 5:
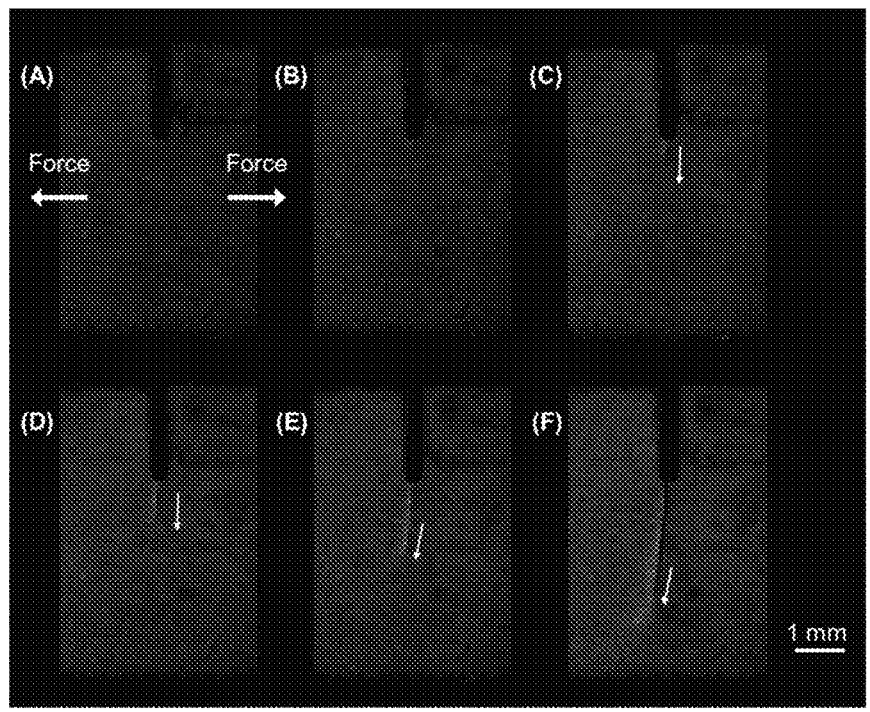
FIG. 5A shows the result of initial samples of 2024 aluminum alloy fatigue crack propagation test.
FIG. 5B shows the result of 2024 aluminum alloy fatigue crack propagation test (F=700 N, 4500 circles)
FIG. 5C shows the result of 2024 aluminum alloy fatigue crack propagation test (F=700 N, 5500 circles)
FIG. 5D shows the result of 2024 aluminum alloy fatigue crack propagation test (F=700 N, 8500 circles)
FIG. 5E shows the result of 2024 aluminum alloy fatigue crack propagation test (F=700 N, 11200 circles)
FIG. 5F shows the result of 2024 aluminum alloy fatigue crack propagation test (F=700 N, 13000 circles).

This method has been verified on other metal components (e.g., aluminum alloy A2024 (as shown in FIG. 5)). As shown in FIG. 5A, when no force is applied to the sample, there is no fluorescence response. When the force (F=700 N) is cyclically applied to 4500 cycles, there are fluorescence signals on the edge of the notch, indicating that stress concentration occurs at this position and fatigue crack generation is induced (FIG. 5B). When the force is cycled to 5500 cycles, the fatigue crack propagates, and there are fluorescence signals at the tip and on two sides of the crack (FIG. 5C). As shown in FIGS. 5E and 5F, fluorescence occurs in the front of the tip of the crack. It indicates that the stress concentration in this area is clearly visualized, which further predict the pathway of fatigue crack propagation in advance. This embodiment indicates a great potential of TPE-4N for mechanical analysis on various metals and different application scenarios.

The present invention provides a method for detecting the mechanical response of a mechanical component by an organic fluorescent material, including: selecting an organic mechanoresponsive fluorescent material, and preparing an organic mechanoresponsive fluorescent material solution; coating the organic mechanoresponsive fluorescent material solution on a surface of a metal sample, and heating to form a film; calibrating fluorescence intensity: irradiating the organic mechanoresponsive fluorescent material film on the surface of a scale distance section of the metal tensile sample by using ultraviolet light as an excitation light source, acquiring fluorescence intensity data on the organic mechanoresponsive fluorescent material film by a detection device, and establishing association data of the fluorescence intensity and the stress/strain intensity; detecting an actual mechanical component: irradiating the organic mechanoresponsive fluorescent material film on the surface of the metal tensile sample by using UV light as an excitation light source, and acquiring fluorescence intensity data on the organic mechanoresponsive fluorescent material film by a detection device; comparatively analyzing the acquired fluorescence intensity of the organic mechanoresponsive fluorescent material film on the surface of the mechanical component with the fluorescence intensity sample data, and determining the size and distribution of the stress/strain suffered by the component according to the fluorescence intensity; by observing fluorescence signal at a crack on the organic mechanoresponsive fluorescent material, monitoring whether a fatigue crack occurs at a part to be detected; and, predicting a crack propagation direction by using the fluorescence intensity distribution near the tip of the crack.

The method for detecting the mechanical response of a mechanical component by an organic mechanoresponsive fluorescent material disclosed and provided by the present invention can be implemented by those skilled in the art by referring to the contents in this article and appropriately changing conditions, routes or other links. Although the method and preparation technology of the present invention have been described by preferred embodiments, it is obvious for those skilled in the related art that the methods and technological route described herein can be modified or recombined to realize the final preparation technology without departing from the content, spirit and scope of the present invention. Particularly, it is to be pointed out that all similar substitutions and modifications are apparent for those skilled in the art and shall fall into the spirit, scope and content of the present invention.

What is claimed is:

1. A method for detecting the mechanical response of a mechanical component by an organic mechanoresponsive fluorescent material, comprising the following steps of:
   (1) selecting an organic mechanoresponsive fluorescent material;
   (2) preparing an organic mechanoresponsive fluorescent material solution;
   (3) forming a film on a metal surface, that is uniformly coating the organic mechanoresponsive fluorescent material solution on a metal surface by a brush, and heating it by a heating tool to form a film;
   (4) calibrating fluorescence intensity: performing uniaxial tensile test on metal samples coated with the organic mechanoresponsive fluorescent material, irradiating coatings on the samples by using an UV light as an excitation light source, establishing a relationship between the fluorescence intensity and the stress/strain by a fluorescence intensity measurement system to serve as fluorescence intensity sample data; analyzing a gray scale of pixels, representing the fluorescence intensity by using the gray scale of the pixels; or, measuring the fluorescence intensity by a fluorescence spectrometer;
   (5) detecting a stress/strain distribution on an actual mechanical component, or monitoring fatigue crack propagation on the actual mechanical component,
   wherein a method for detecting the stress/strain distribution on the actual mechanical component in step (5) comprises: irradiating the organic mechanoresponsive fluorescent material film coated on the surface of the mechanical component to be detected by an UV light, and obtaining the stress/strain distribution on a part to be detected by using the fluorescence intensity obtained by the fluorescence intensity measurement system and comparing an actually measured fluorescence result with sample data of a fluorescence spectrum, and
   wherein a method for monitoring fatigue crack propagation on the actual mechanical component in step (5) comprises: irradiating the organic mechanoresponsive fluorescent material film coated on the surface of the mechanical component to be detected by an UV light, observing fluorescence signal generated at cracks to monitor the occurrence of fatigue cracks, and detecting the fluorescence intensity and distribution in a crack tip area; since high fluorescence intensity indicates high stress concentration, the fatigue crack is easy to propagate along the direction having high stress concentration, thus a propagation pathway of fatigue cracks is predicted.

2. The method according to claim 1, wherein the organic mechanoresponsive fluorescent material is tetranitro-tetraphenyl ethylene (TPE-4N).

3. The method according to claim 2, wherein the concentration of the prepared TPE-4N solution is in the range of 1.00 to 0.01 g/mL.

4. The method according to claim 1, wherein the heating tool is a heat gun, a heating furnace or a heating jacket, and the heating temperature is in the range of 80° C. to 300° C.

5. The method according to claim 1, wherein the organic mechanoresponsive fluorescent material solution can be prepared in advance and stored away from light, is capable of coating on-site, and heated to form a film by a heat gun or a heating jacket.

* * * * *